Figure 1:
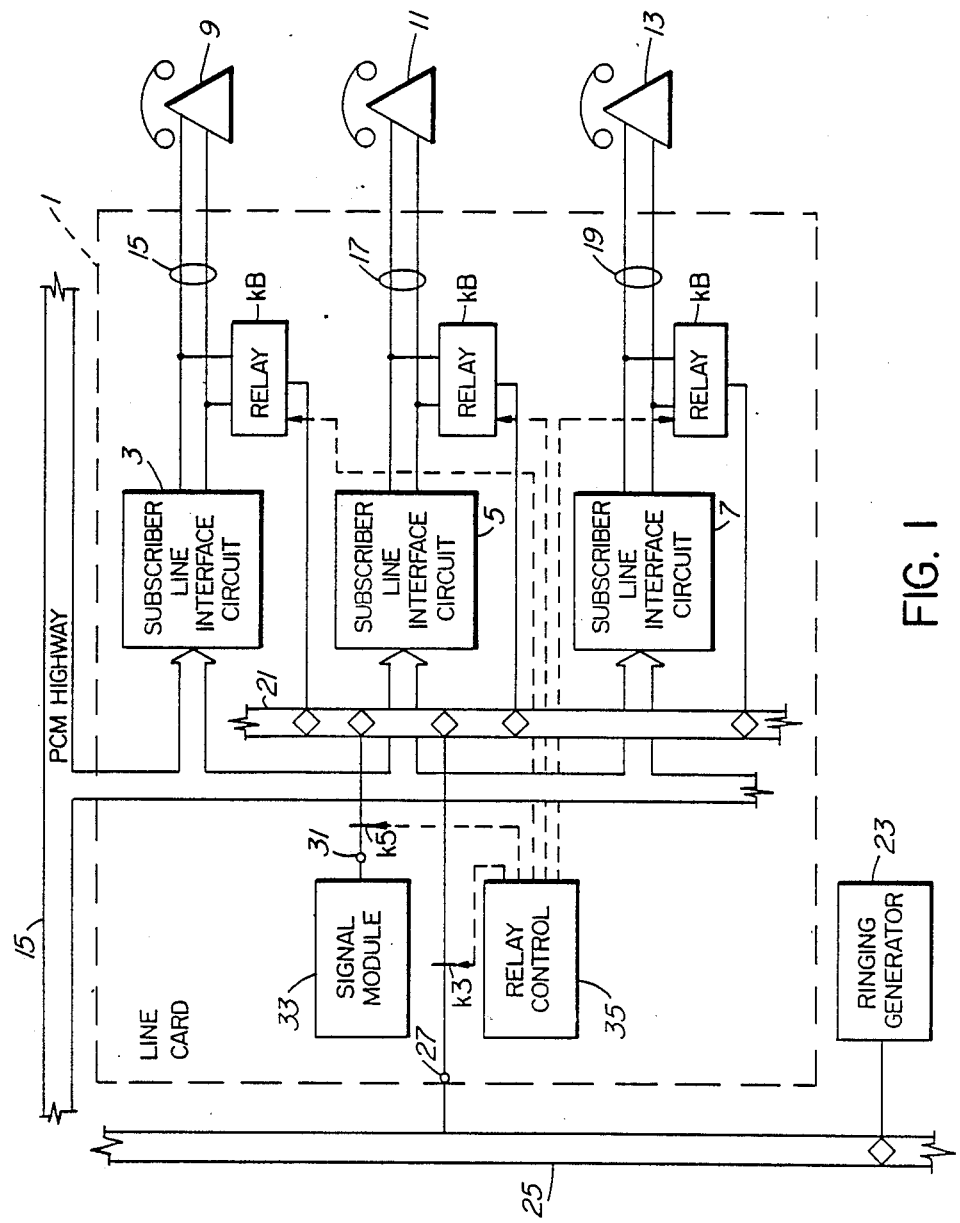

United States Patent [19]

Meier

[11] Patent Number: 4,926,467
[45] Date of Patent: May 15, 1990

[54] LINE CARD WITH DISTRIBUTED SIGNALING VOLTAGES

[75] Inventor: Rolf Meier, Carp, Canada

[73] Assignee: Mitel Corporation, Ontario, Canada

[21] Appl. No.: 388,942

[22] Filed: Aug. 3, 1989

[30] Foreign Application Priority Data

Aug. 15, 1988 [CA] Canada ................................. 574775

[51] Int. Cl.⁵ ...................... H04M 3/02; H04M 13/00
[52] U.S. Cl. ..................................... 379/146; 379/252; 379/418; 379/179; 379/350
[58] Field of Search ............... 379/146, 251, 252, 418, 379/179, 197, 350

[56] References Cited

U.S. PATENT DOCUMENTS 4,701,948 10/1987 Molnar ............................ 379/252 X Primary Examiner—Stafford D. Schreyer
Attorney, Agent, or Firm—Antonelli, Terry, Stout & Kraus

[57] ABSTRACT

A central office line card with distributed signaling voltages comprised of a plurality of subscriber line interface circuits connected to a common signal bus. Standard ringing signal is received from a remote generator within the central office and applied to the common signal bus via a first relay. A receptacle is provided on the line card for receiving a removable module containing circuitry for generating further signaling voltages such as party line ringing and coin telephone test and control voltages. Signals from the module are applied to the common signal bus via a further plurality of relays. Each of these subscriber line interface circuits is connected to the common signal bus via additional respective relays.

8 Claims, 3 Drawing Sheets

LINE CARD WITH DISTRIBUTED SIGNALING VOLTAGES

This invention relates in general to telephone systems, and more particularly to a central office line card with distributed signaling voltages.

In a telephone central office various types of signaling voltages are required to be generated for transmission to different types of telephones connected thereto via well known balanced tip and ring leads. For example, in North America, a standard telephone requires a 90 volts RMS ringing signal voltage at 20 hertz applied to one of either the ring or tip lead. Telephones which are connected in parallel forming a party line, require specific identifying DC voltages superimposed on the ringing signal voltage in order to identify particular ones of the telephones connected in the party line. Furthermore, coin operated telephones typically require ±130 volt DC control voltage for operating a solenoid to direct a coin to one of either the collection box or the customer, depending on the polarity of the control voltage. Also, ±48 volt test voltages are required for coin operated telephone lines in order to detect a presence of a coin.

According to prior art systems, ringing signal voltages as well as the required DC signaling voltages for party lines and coin operated telephones were generated by one or more signal generators in the central office and applied via respective relays to the tip or ring lead of a subscriber line interface circuit disposed on a line card. Thus, a relay was associated with each of the signaling voltages applied to each of the telephone lines connected to the central office. This resulted in a large number of relays, and consequently great expense and circuit board complexity.

An improved distributed signaling system was utilized by Northern Telecom on the DMS 100 TM exchange, According to the Northern Telecom system a sophisticated signal generator is used for generating all of the required signaling voltages and applies the voltages in time division multiplex fashion to a common signaling bus which extends along the exchange backplane, and is connected to individual trunk cards of the exchange. Thus, the remote signal generator transmits the various signaling voltages such as +130, −130 volts, 90 volts RMS, etc., in respective time slots onto the signaling bus for reception by a plurality of subscriber line interface circuits each including circuitry for demultiplexing the time divided signals.

A fundamental disadvantage of the Northern Telecom system is that each of the subscriber line interface circuits which requires a particular signaling voltage must wait until that voltage is available in the time division multiplex sequence. Thus, with many line circuits connected to a bus (eg. typically more than 100 line circuits in a central office configuration), the single generator in the Northern Telecom system is incapable of supplying all of the required signaling voltages to each of the line circuits needing them at a particular instant in time.

Furthermore, the common signal generator in the Northern Telecom system must be sophisticated enough to provide all of the voltages required within the central office exchange. In other words, complex and expensive circuitry is required to generate all of the required signaling voltages in recurring sequence, even though there may only be a single coin operated telephone or party line configuration within the system which would require the special associated signaling voltage.

According to the present invention, a central office line card is provided which is comprised of a common signaling bus connected to a plurality of subscriber line interface circuit via respective relays. The signaling bus is connected to a remote ringing signal generator by a relay, for receiving a 90 volts RMS 20 Hertz ringing signal which is common to all telephones connected to the central office. A receptacle is provided connected to the signaling bus on the line card via a further relay, for receiving a removable module for generating additional signaling voltages such as those required for operating coin telephones or party line telephone sets.

By utilizing a common signaling bus on the line card to distribute different signaling voltages, the requirement of prior art systems for multiple relays per line for signaling voltage, is avoided. The module is inserted within the receptacle only in the event that the particular signaling voltages are required on the line card. Thus, in contrast with the expensive and complex time division multiplex signal generating circuitry of Northern Telecom, according to the present invention a small, inexpensive module can be added to the line card for generating specialized signaling voltages (eg. coin telephone or party line voltages).

For example, in a central office with 400 lines, as few as three lines may be connected to coin operated telephones. Thus, according to the present invention only one line card would require a specialized signaling module to be connected thereto, the remaining line cards supporting an empty receptacle and being connected only to the standard ringing signal generator.

Moreover, ringing signal voltage as well as any required specialized signaling voltages are applied to the telephone lines immediately according to the present invention, such that the prior art disadvantage of being required to wait for an available signaling voltage time slot, is overcome.

In general, according to the present invention there is provided for use in a telephone system having a plurality of remote telephones connected thereto, and including a ringing generator for generating ringing signals for application to the remote telephones; a line card circuit for distributing and applying the ringing signals and predetermined control signals to the remote telephones, comprised of a plurality of subscriber line interface circuits for connection to respective ones of the telephones via two-wire telephone lines, a signalling bus connected via first relay circuitry to respective ones of the telephone lines, and via second relay circuitry to the ringing generator, a removable signal module for generating the predetermined control signals, a receptacle for receiving the signal module comprised of one or more terminals for connection to the signal module via third relay circuitry to the bus, and circuitry for selectively actuating the first, second and third relay circuitry for selectively connecting one of either the ringing generator or the signal module to predetermined ones of the telephone lines via the bus, whereby the ringing signals and the predetermined control signals are selectively distributed and applied to respective ones of the telephones connected to the two-wire telephone lines.

Figure 2:
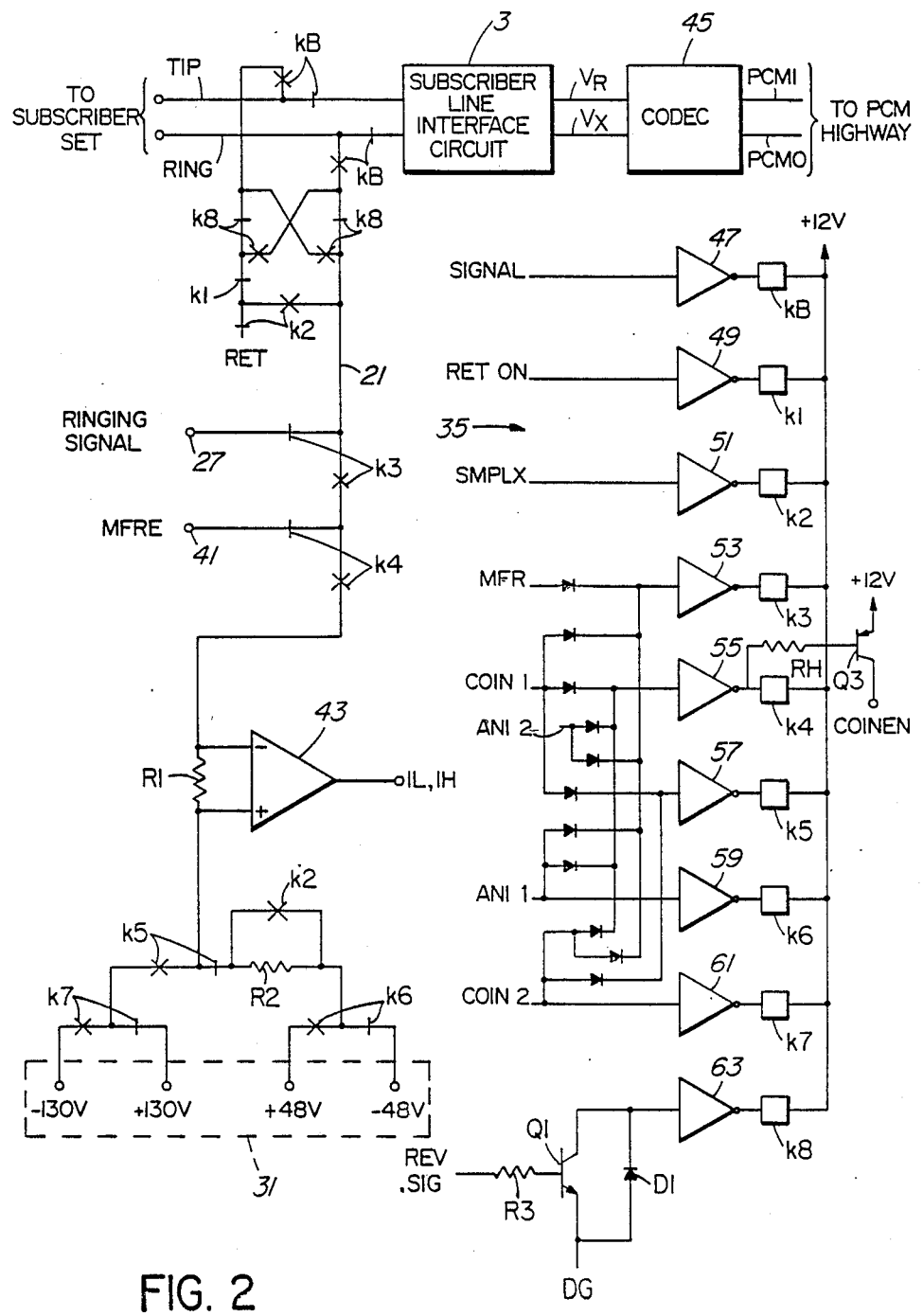
Figure 3:
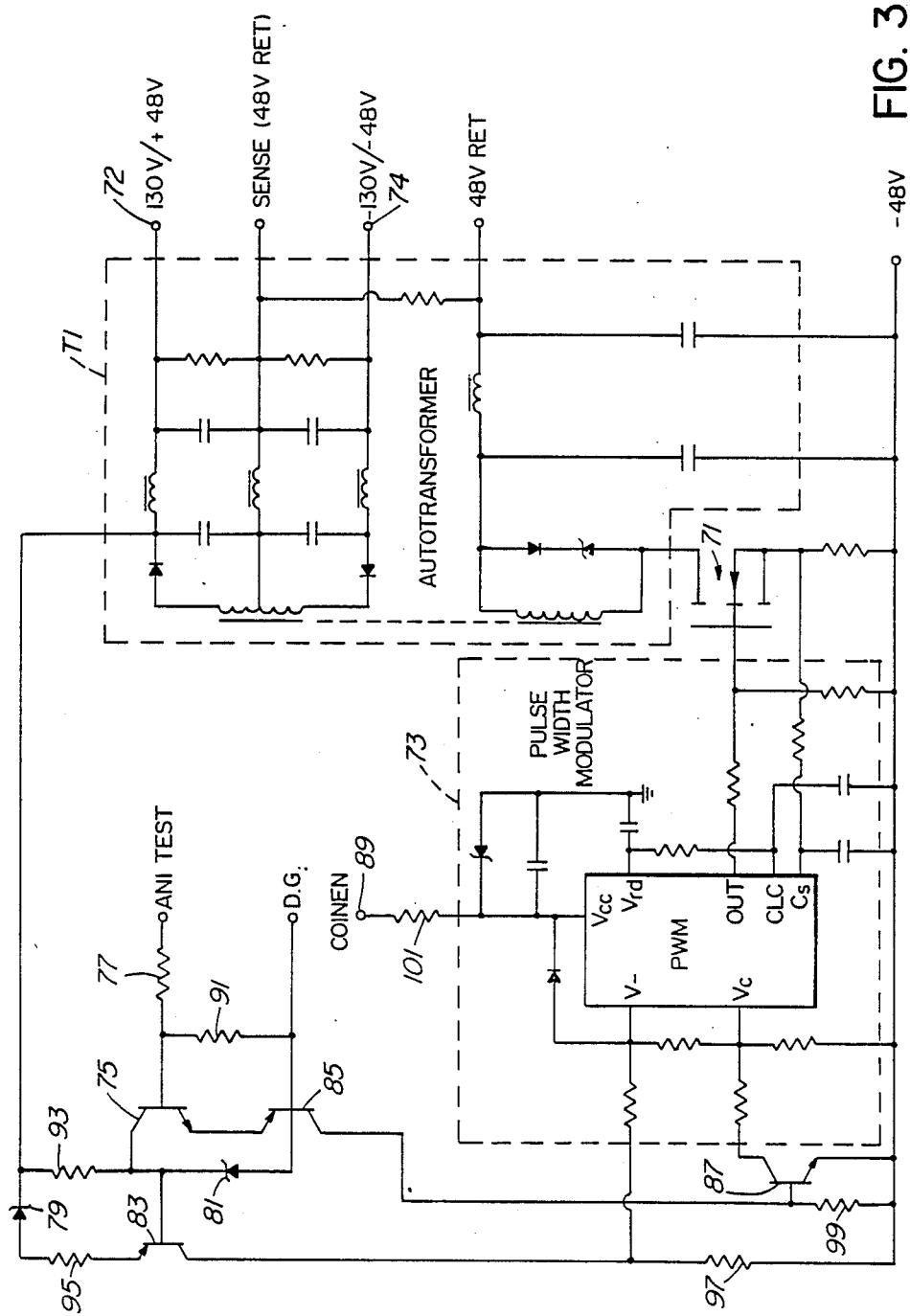

A better understanding of the present invention will be obtained with reference to the detailed description below in conjunction with the following drawings in which:

FIG. 1 is a block diagram showing a line card in accordance with the present invention in its most general form, FIG. 2 is a schematic diagram illustrating relay circuitry in the line card of FIG. 1, and FIG. 3 is a schematic diagram of a coin signaling voltage module in accordance with the preferred embodiment of present invention.

Turning to FIG. 1, a central office line card 1 is shown comprised of a plurality of subscriber line interface circuits 3, 5 . . . 7 connected via respective telephone lines 15, 17 . . . 19 to remote telephones 9, 11 . . . 13. Each of the telephone lines 15, 17 . . . 19 is also connected via respective relays KB, to a common signaling bus 21.

A remote ringing signaling generator 23 is disposed within the central office circuitry remote from the line card 1, and is configured for generating well known 90 volt RMS 20 Hertz ringing signal voltage. The circuitry of ringing generator 23 does not form part of the present invention, and is very well known in the art. Ringing signal voltage is transmitted from generator 23 and applied to a central office backplane bus 25 connected to the line card 1 via a terminal 27, and to the common signal bus 21 via a further relay K3.

Although not shown, typically a plurality of line cards such as line card 1 would be provided in the central office, each connected to backplane bus 25 and each comprised of a plurality of subscriber line interface circuits. For example, in a central office with 400 lines, 67 such line cards would be required, each including six subscriber line interface circuits.

Also incorporated within the line card 1 is a receptacle shown diagrammatically via additional terminal 31, for receiving an optional removable signal module 33 for generating special signaling voltages such as those required for operating coin telephone sets and party line telephone sets.

A relay control circuit 35 is provided for generating control signals to activate relays KB, K3 and K5. Thus, in operation, relay control circuit 35 generates signals for connecting one of either signal module 33 or ringing generator 23 to the common signal bus 21 via relays K5 and K3. Next, predetermined ones of the telephone lines 15, 17 . . . 19 connected to telephone sets 9, 11 . . . 13 are connected to the signaling bus for receiving one of either ringing signal from generator 23 or special signaling voltages from module 33, via the KB relays.

Thus, in a typical central office exchange, a majority of the plurality of line cards 1 would not include the signal module 33, and would be provided only with an empty receptacle 31. However, any party line or coin telephones requiring special signal voltages would be connected to a line card of the exchange which includes an appropriate signal module 33. In this way, the large majority of line cards are provided with minimal circuitry for connecting individual subscriber line interface circuits to the PCM highway 15, and common signal bus 21, and for connecting the remote ringing generator to the bus. Yet only a small number of line cards are provided with the special signal module 33 for generating coin telephone and party line signal voltages.

Thus, as discussed above, each line card includes a minimum of expensive and complex circuitry, requiring only a small number of relays, while, each of the telephones is provided with instantaneous signaling voltages, without being required to wait for the signaling voltage to appear periodically in a time divided multiplex sequence, as in the prior art.

Turning to FIG. 2, a schematic diagram of a preferred embodiment of the line card of the present invention is shown connected to TIP and RING leads of a predetermined one of the subscriber line interface circuits, such as circuit 3 in FIG. 1, via a pair of relays KB. Ringing signal from the remote ringing generator 23 (FIG. 1) is received via terminal 27 and applied to the common signal bus 21 via relay K3. Signals from the removable signal module 33 (FIG. 1) are received via receptacle 31, as discussed in greater detail below.

A further test signal MFRE is received via additional terminal 41 and is applied via relay K4 to the signal bus 21.

Signals appearing on bus 21 may be applied in various modes to the TIP and RING lead. For example, signaling voltage may be applied to both the tip and ring leads by closing the KB relays as well as the K2 relay. This is known in the art as simplex signaling. Alternatively, the signaling voltage can be reversed via reversal relays K8 in order to accomplish signaling polarity reversal without requiring a reversal in the battery feed polarity.

The subscriber line interface circuit 3 is shown with unidirectional transmit and receive leads carrying respective transmit and receive signals $V_X$ and $V_R$ to and from a codec 45 which converts analog signals on the TIP and RING lead to digital signals carried by input and output PCM leads PCMI and PCMO to and from PCM highway 15, in a well known manner.

Normally, the RING lead is connected via relay KB to the remote ringing generator 23 (FIG. 1) via relays K8 and K3, with the TIP lead being connected via relays KB, K8, K1 and K2 to the ground return terminal RET.

The test voltages MFRE received on terminal 41 are applied via relay K4 differentially to inverting and non-inverting inputs of a threshold detection circuit 43, for detecting presence of coins in coin operated telephones, or determining which member of a party line is making a toll call. The threshold detection circuit 43 and operation thereof does not form part of the present invention, and is discussed herein for the purpose of completeness only.

The external signal module 33 (FIG. 1) is plugged into receptacle 31 which is comprised of a plurality of terminals for receiving signal voltages such as −130 volts, +130 volts, +48 volts and −48 volts. The +130 volt and −130 volt signals are selected by means of a relay K7 and applied to the signal bus 21 via a relay K5. Similarly the +48 volt and −48 volt signals are selected via a relay K6 and applied to signal bus 21 via the K5 relay. The +48 volt and −48 volt signals may be applied to signal bus 21 either directly through relay K2 or via a current limiting resister R2.

The relays KB and K1–K8 are controlled via a relay control circuit 35 comprised of a plurality of inverters 47–63 having respective outputs thereof connected to energizing coils for the relays KB, K1–K8, each of the relay coils also being connected to a source of +12 volt relay energizing current.

In operation, the signal bus 21 is connected to the TIP and RING leads via the KB relays in response to generation of a control signal designated SIGNAL by a remote peripheral controller (not shown) of the telephone system. The control signal is applied to the input of inverter 47 such that the output thereof goes to a logic low (ie. ground) level causing the current to flow from the +12 volt source through the KB energizing relay coil to ground. The signal bus 21 is connected to the TIP and RING leads for receiving various different modes of signaling. For example, signaling voltages on the bus 21 may be applied to both of the tip and ring leads by closing the K2 relay in order to provide simplex signaling. This is accomplished by the peripheral controller generating an SMPLX control signal for application to the input of the inverter 51, causing energizing current to flow through the K2 relay coil. Alternatively, signaling reversal may be accomplished without battery feed reversal by actuating relay K8. This is done by the peripheral controller generating a REV-SIG control signal for application to transistor Q1 via current limiting resistor R3. The emitter of transistor Q1 is connected to circuit ground DG as well as to the collector of transistor Q1 via a diode D1.

The K1 relay is actuated to provide battery return RET to the TIP lead. This is accomplished by means of the peripheral controller generating a RET ON control signal to the input of inverter 49, causing energizing current to flow through the K1 relay coil.

Ringing signal is received from the remote ringing generator 23 (FIG. 1) via backplane bus 25 and terminal 27 of the trunk card and applied to the signal bus 21 via normally closed relay K3. However, upon actuating relays K3 and K4, remote signaling voltages may be received from the signal module 33. In particular, the peripheral controller generates one or more control signals designated MFR, COIN 1, ANI 2, ANI 1 or COIN 2 for energizing the K3 relay, and generates one or more of the COIN 1, ANI 2, ANI 1 or COIN 2 signals for energizing the K4 relay.

Furthermore, upon energizing the K4 relay, current flows from the base of PNP transistor Q2 through resister R4 to ground, thereby enabling transistor Q3 such that the voltage on a collector terminal thereof rises to +12 volts. The collector terminal of transistor Q3 is connected to a COINEN enable input of signal module 33, as discussed in greater detail below with reference to FIG. 3.

As discussed above, one of either the −130 volt of +130 volt coin signal voltages may be selected by enabling or disabling the K7 relay by alternately generating logic high or logic low level COIN 2 control signals, and the K5 relay may be enabled or disabled by generating logic high and logic low COIN 1 and COIN 2 control signals. Similarly, one of either the +48 volt or −48 volt signal voltages may be selected in response to selectively energizing the K6 relay by means of generating logic high or logic low ANI 1 control signals. For example, in order to apply a +48 volt party line signal voltage to the RING lead, the K6, K4, K3 and KB relays are energized. The +48 volt control signal may be applied with reverse battery by means of energizing the K8 relay. Alternatively, the +48 volt signal may be applied to both the TIP and RING leads by enabling the K2 relay, in which case the +48 volt control signal bypasses damping resistor R2.

Turning to FIG. 3, a schematic diagram is illustrated showing signal module 33 configured as a coin telephone module. Alternatively, the signal module 33 may contain circuitry for generating message waiting lamp control signals, party line selective ringing signals, etc.

In general, the circuit of FIG. 3 illustrates a fly-back power supply utilizing an auto transformer T1, as opposed to an isolated transformer such as used in standard implementations. A main power switch 71 (eg. a power MOSFET) is driven by a pulse width modulator 73 for producing +130 volt/+volt, −130 volt/−48 volt, and 48 volt control signals referenced to a +48 volt return (ie. SENSE). The control signals are selectable between +130 volt, −130 volt and +48 volt, −48 volt by means of a further control signal ANI TEST generated by the peripheral controller (not shown) and applied to the base of transistor 75 via current limiting resistor 77. In particular, in response to a logic low level ANI TEST signal applied to the base of transistor 75, the transistor 75 remains off such that the voltage drop between the terminal 72 and the digital ground terminal (DG) remains at +130 volts, due to the combined +130 volt voltage drop of zener diodes 79 and 81. In particular, diode 79 provides a 48 volt drop while diode 81 provides an 82 volt drop. In the event that the voltage at terminal 72 rises above +130 volts, transistor 83 begins conducting, thereby inhibiting the pulse width modulator 73.

In order to produce +48 volt and −48 volt signals on the terminals 72 and 74, the peripheral controller generates a logic high level ANI TEST signal for application to transistor 75. In response, transistor 75 conducts, thereby bypassing zener diode 81 such that the voltage appearing at terminal 72 is +48 volts, appearing across zener diode 79, while the voltage at terminal 74 is −48 volts due to the reverse polarity transformer coupling of auto-transformer T1.

Additional transistors 85 and 87 provide current limiting protection of the auto transformer power supply. For example, in the event that the +130 volt and −130 volt output is selected, the current limiting is set at approximately 50 milliamps, while in the event that the output is selected for +48 volts and −48 volts, the current limit is set to approximately to 15 milliamps in response to enabling transistors 85 and 87, thereby reducing the voltage applied to the $V_C$ input of the PWM circuit within pulse width modulator 73 from 3 volts down to approximately +1 volt.

The-coin module power supply of FIG. 3 switches at a high frequency rate of approximately 0.5 megahertz.

As discussed above, the COINEN signal is generated in response enabling the K4 relay for receiving signals from the remote signal module 33. The COINEN signal is applied via terminal 89 to the pulse width modulator 73 for enabling the PWM circuit via power input terminal $V_{CC}$. Thus, the signal module 33 draws power only in the event that relay K4 is energized, thereby reducing power consumption within the system when the signal module 33 is not in use.

Additional circuitry such as resistors 91, 93, 95, 97, 99 and 101 are provided for current limiting and buffering, in a well known manner.

The +130 volt signal is utilized to collect a coin in a remote coin telephone connected to the line card 1, while the −130 volt control signal causes the coin to be released. Similarly, the +48 volt and the −48 volt signals are utilized for providing party line identification detection within a party line system, in a well known manner.

In summary, according to the present invention a line card is provided for use in a central office telephone system wherein a common bus is provided on the card for distributing signaling voltages such as message waiting, coin control, test, party line control, etc. By incorporating the common signaling bus on the line card itself as opposed to utilizing a backplane bus as in prior art system, smaller granularity is provided over prior art systems.

Also, circuitry is provided in the present invention for reversing, opening or closing the signaling applied to the tip and ring leads, without requiring battery feed reversal, etc., as in the prior art. Moreover, the provision of external signaling voltage on a pay-as-you-go basis alleviates the prior art requirement for sophisticated and expensive centralized signal generators. In addition, the circuitry for connecting the external signal module to the common line card signal bus prevents the signal module from drawing power when not in use.

A person understanding the present invention may conceive of other embodiments or variation therein. All such embodiments or variations are believed to be within the sphere and scope of the present invention as defined in the claims appended hereto.

I claim:

1. In a telephone system having a plurality of remote telephones connected thereto, and including a ringing generator for generating ringing signals for application to said remote telephones; a line card circuit for distributing and applying said ringing signals and predetermined control signals to said remote telephones, comprised of:
   (a) a plurality of subscriber line interface circuits for connection to respective ones of said telephones via two-wire telephone lines,
   (b) a signalling bus connected via first relay means to respective ones of said telephone lines and via second relay means to said ringing generator,
   (c) a removable signal module for generating said predetermined control signals,
   (d) a receptacle for receiving said signal module comprised of one or more terminals for connection to said signal module via third relay means to said bus, and
   (e) means for selectively actuating said first, second and third relay means for selectively connecting one of either said ringing generator or said signal module to predetermined ones of said telephone lines via said bus, whereby said ringing signals and said predetermined control signals are selectively distributed and applied to respective ones of said telephones connected to said two-wire telephone lines.

2. A line card circuit as defined in claim 1, wherein said first relay means is comprised of a first relay pair for connecting said bus to said telephone lines, a second relay pair for reverse connecting said bus to said telephone lines through said first relay pair, and a third relay for selectively connecting one line of said two-wire telephone line to one of either a signal return or to said bus for effecting simplex signalling.

3. A line circuit card as defined in claim 2, wherein said signal module is comprised of a coin control circuit for generating predetermined coin control signal voltages for controlling capture and release of coins in a remote coin operated telephone connected to said line card via said two-wire telephone lines.

4. A line circuit card as defined in claim 2, wherein said signal module is comprised of a party line control circuit for generating party line control signal voltages for identifying and controlling ringing of respective ones of said remote telephones connected in a party line to said line card via said two-wire telephone lines.

5. A line circuit card as defined in claim 2, wherein said signal module is comprised of a message waiting control circuit for generating message waiting control signals for controlling message waiting lamps of said remote telephones connected to said line card via said two-wire telephone lines.

6. A line circuit card as defined in claim 3, 4 or 5 further including circuitry for generating an enable signal for applying operating power to said signal module in response to said third relay means being actuated.

7. A line circuit card as defined in claim 3, wherein said coin module is comprised of a switched autotransformer circuit for generating a +130 volt coin capture control voltage and a −130 volt coin release control voltage.

8. A line circuit card as defined in claim 7, wherein said switched autotransformer circuit includes circuitry for generating +48 volt and −48 volt party line control and identification signals.

* * * * *